(12) United States Patent
Yan et al.

(10) Patent No.: US 10,640,406 B2
(45) Date of Patent: May 5, 2020

(54) SURFACE MODIFICATION OF ZERO VALENT IRON MATERIAL FOR ENHANCED REACTIVITY FOR DEGRADING CHLORINATED CONTAMINANTS IN WATER

(71) Applicant: Texas Tech University System, Lubbock, TX (US)

(72) Inventors: Weile Yan, Lubbock, TX (US); Yanlai Han, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 131 days.

(21) Appl. No.: 15/594,919

(22) Filed: May 15, 2017

(65) Prior Publication Data

US 2017/0334755 A1    Nov. 23, 2017

Related U.S. Application Data

(60) Provisional application No. 62/337,441, filed on May 17, 2016.

(51) Int. Cl.

| | |
|---|---|
| *C02F 1/70* | (2006.01) |
| *B09C 1/00* | (2006.01) |
| *C02F 101/36* | (2006.01) |
| *B09C 1/08* | (2006.01) |
| *C02F 103/06* | (2006.01) |

(52) U.S. Cl.
CPC ............ *C02F 1/705* (2013.01); *B09C 1/00* (2013.01); *B09C 1/002* (2013.01); *B09C 1/08* (2013.01); *C02F 2101/36* (2013.01); *C02F 2103/06* (2013.01)

(58) Field of Classification Search
CPC ......................................................... C02F 1/70
See application file for complete search history.

(56) References Cited

U.S. PATENT DOCUMENTS

| | | |
|---|---|---|
| 6,464,005 B1 | 10/2002 | Ellis |
| 6,709,567 B1 | 3/2004 | Sale et al. |
| 7,576,162 B2 | 8/2009 | Struck et al. |
| 7,635,236 B2 | 12/2009 | Zhao et al. |
| 7,641,971 B2 | 1/2010 | Papagianakis |

(Continued)

OTHER PUBLICATIONS

Rajajayavel et al. "Enhanced reductive dechlorination of trichloroethylene by sulfidated nanoscale zerovalent iron" Water Research, 78, p. 144-153, Apr. 14, 2015. (Year: 2015).*

(Continued)

*Primary Examiner* — Ryan B Huang
(74) *Attorney, Agent, or Firm* — Loza & Loza LLP; Kevin L. Soules

(57) ABSTRACT

Methods, systems, and compounds for degrading chlorinated compounds in water. A facile aqueous-based surface treatment of zero-valent iron is provided to increase the reactivity of a zero-valent iron material for degrading chlorinated compounds in the water without the use of a noble metal catalyst. Such a facile aqueous-based surface treatment can be implemented as a surface sulfidation pre-treatment of iron to increase its reactivity towards chlorinated contaminants in water. The disclosed facile aqueous-based surface treatment increases reactivity utilizing sulfur compounds for use in the degradation of the chlorinated compounds in the water.

11 Claims, 5 Drawing Sheets

(56) References Cited

U.S. PATENT DOCUMENTS

| | | | |
|---|---|---|---|
| 8,187,862 | B2 | 5/2012 | Saul et al. |
| 8,277,657 | B2 | 10/2012 | Lovley et al. |
| 8,758,616 | B2 | 6/2014 | Zhang et al. |
| 8,758,617 | B2 | 6/2014 | Quan et al. |
| 8,859,036 | B2 | 10/2014 | Papagianakis |
| 9,488,582 | B2 | 11/2016 | Sinfield et al. |
| 2015/0119232 | A1 | 4/2015 | Moser et al. |
| 2015/0329388 | A1 | 11/2015 | Gong |
| 2016/0023920 | A1 | 1/2016 | Doyle et al. |
| 2016/0052808 | A1 | 2/2016 | Huang |
| 2016/0145134 | A1 | 5/2016 | Simmons |
| 2017/0029298 | A1 | 2/2017 | Code et al. |
| 2017/0057850 | A1 | 3/2017 | Smith et al. |
| 2017/0073260 | A1 | 3/2017 | Strano et al. |

OTHER PUBLICATIONS

Bedner et al. "Making chlorine greener: investigation of alternatives to sulfite for dechlorination", Water Research 38, 2004, 2505-2514 (Year: 2004).*
Fan et al. "Reductive sequestration of pertechnetate by nano zerovalent iron transformed by abiotic sulfide", Environ. Sci. Technol. 2013, 47, 5302-5310 (Year: 2013).*
Radhakrishnan, T. P. et al., Permeation of Hydrogen through Steel by Electrochemical Transfer—I. influence of Catalytic Poisons, Electrochimica Acta (1966) 11:1007-1021.
Rajajayavel, S. R. C. et al., Enhanced reductive dechlorination of trichloroethylene by sulfidated nanoscale zerovalent iron, Water Research (2015) 78:144-153.
Roberts, A. L. et al., Reductive Elimination of Chlorinated Ethylenes by Zero-Valent Metals, Environ. Sci. Technol. (1996) 30(8):2654-2659.
Sander, R., Compilation of Henry's Law Constants for Inorganic and Organic Species of Potential Importance in Environmental Chemistry, Ver. 3, Apr. 8, 1999, 107 pages.
Sarathy, V. et al., Aging of Iron Nanoparticles Aqueous Solution: Effects on Structure and Reactivity, J. Phys. Chem. C (2008)112:2286-2293.
Schmitt, G., Effect of Elemental Sulfur on Corrosion in Sour Gas Systems, Corrosion (1991)47(4):285-308.
Smart, R. S. et al., XPS of Sulphide Mineral Surfaces: Metal-deficient, Polysulphides, Defects and Elemental Sulphur, Surface and Interface Analysis (1999) 28:101-105.
Song, H. et al., Catalytic hydrodechlorination of chlorinated ethenes by nanoscale zero-valent iron, Applied Catalysis B: Environmental (2008) 78:53-60.
Stroo, H. F. et al., Chlorinated Solvent Source Zones, Environ. Sci. Technol. (2003) 37:225-230.
Stroo, H. F. et al., Chlorinated Ethane Source Remediation: Lessons Learned, Environ. Sci. Technol. (2012) 46:6438-6447.
Sun, Q. et al., Comparison of the Reactivity of Nanosized Zero-Valent Iron (nZVI) Particles Produced by Borohydride and Dithionite Reduction of Iron Salts, Nano Brief Reports and Reviews (2008) 3(5):341-349.
Suter, D. et al., Dissolution of Hydrous Iron(III) Oxides by Reductive Mechanisms, Langmuir (1991)7:809-813.
Szecsody, J. E. et al., In Situ Chemical Reduction of Aquifer Sediments: Enhancement of Reactive Iron Phases and TCE Dechlorination, Environ. Sci. Technol. (2004) 38:4656-4663.
Turcio-Ortega, D. et al., Reactivity of Fe/FeS Nancparticles: Electrolyte Composition Effects on Corrosion Electrochemistry, Environ. Sci. Technol. (2012) 46:12484-12492.
Urbano, F. J. et al., Hydrogenolysis of organohalogen compounds over palladium supported catalysts. Journal of Molecular Catalysis A: Chemical (2001) 173:329-345.
Williams, M. L., CRC Handbook of Chemistry and Physics, 76$^{th}$ Edition, Book Review, Occup. Environ. Med. (1996) 53(7):504.
Xie, Y. el al., Use of Dithionite to Extend the Reactive Lifetime of Nanoscale Zero-Valent Iron Treatment Systems, Environ Sci. Technol. (2016) 44:8649-8655.
Yan, W. et al., Nanoscale zero-valent iron (nZVI): Aspects of the core-shell structure and reactions with inorganic species in water, Journal of Contaminant Hydrology (2010) 118:96-104.
Alonso, E et al., Metal-Mediated Reductive Hydrodehalogenation of Organic Halides, Chem. Rev. (2002) 102:4009-4091.
Arnold, W. A. et al., Pathways and Kinetics of Chlorinated Ethylene and Chlorinated Acetylene Reaction with Fe(0) Particles, Environ. Sci. Technol. (2000) 34:1794-1805.
Berkowitz, B. J. et al., THe Role of H2S in the Corrosion and Hydrogen Embrittlement of Steel, J. Electrochem. Soci. (1982) 129:468-474.
Berkowitz, B. J. et al., The Role of Hydrogen in Sulfide Stress Cracking of Low Alloy Steels, Corrosion (1984) 40:240-245.
Burke, M. L. et al., Hydrogen on Pd(100)-S: the effect of sulfur on precursor mediated adsorption and desorption, Surface Science (1990) 237:1-19.
Butler, E. C. et al., Effects of Solution Composition and pH on the Reductive Dechlorination of Hexachloroethane by Iron Sulfide, Environ. Sci. Technol. (1998) 32:1276-1284.
Butler, E. C. et al., Kinetics of the Transformation of Trichloroethylene and Tetrachloroethylene by Iron Sulfide, Environ. Sci. Technol. (1999) 33:2021-2027.
Butler, E. C. et al., Factors Influencing Rates and Products in the Transformation of Trichloroethylene by Iron Sulfide and Iron Metal, Environ. Sol. Technol. (2001) 35:3884-3891.
Butler, E. C. et al., Transformation of Trichloroethylene to Predominantly Non-Regulated Products under Stimulated Sulfate Reducing Conditions, Groundwater Monitoring & Remediation (2013) 33(3):52-60.
Cantrell, K. J. et al., Oxidation of H2S by Iron Oxides in Unsaturated Conditions, Environ. Sci. Technol. (2003) 37:2192-2199.
Crane, R. A. et al., Nanoscale zero-valent iron: Future prospects for an emerging water treatment technology, Journal of Hazardous Materials (2012) 211-212:112-125.
Doherty, R. E., A History of the Production and Use of Carbon Tetrachloride, Tetrachloroethylene, Trichloroethylene and 1,1,1-Trichloroethane in the United States: Part 1—Historical Background; Carbon Tetrachloride and Tetrachloroethylene, Journal of Environmental Forensices (2000) 1:69-81.
Doherty, R. E., A History of the Production and Use of Carbon Tetrachloride, Tetrachloroethylene, Trichloroethylene and 1,1,1-Trichloroethane in the United States: Part 2—Trichloroethylene and 1,1,1-Trichloroethane, Journal of Environmental Forensics (2000) 1:83-93.
Egloff, G. et al., Polymerization and Decomposition of Acetylene Hydrocarbons, J. Phys. Chem. (1932) 36:1457-1520.
Elsner, M. et al., Current Perspectives on the Mechanisms of Chlorohydrocarbon Degradation in Subsurface Environments: Insight from Kinetics, Product Formation, Probe Molecules, and Isotope Fractionation, ACS Symposium Series, Aquatic Redox Chemistry (2011) 1071:407-439.
Fan, D. et al., Reductive Sequestration of Pertechnetate (99TcO4-) by Nano Zerovalent Iron (nZVI) Transformed by Abiotic Sulfide, Environ. Sci. Technol. (2013) 47:5302-5310.
Fan, D. et al., Sultidation of Nano Zerovalent Iron (nZVI) for Improved Selectivity During In-Situ Chemical Reduction (ISCR), Environ. Sci. Technol. (2016) 50:9558-9565.
Garcia, A. N. et al., Enhanced Dechlorination of 1,2-Dichloroethane by Coupled Nano Iron-Dithionite Treatment, Environ. Sci. Technol. (2016) 50:5243-5251.
Gillham, R. W. et al., Enhanced degradation of halogenated aliphatics by zero-valent iron, Groundwater (1994) 32:958-967.
Greenwood, N. et al., Chemistry of the Elements, Second Edition, Elsevier (1997) book.
Han, Y. et al., Bimetallic nickel-iron nanoparticles for groundwater decontamination: Effect of groundwater constituents on surface deactivation, Water Research (2014) 66:149-159.

(56) References Cited

OTHER PUBLICATIONS

Han, Y. et al., Trichloroethene hydrodechlorination by Pd—Fe bimetallic nanoparticles: Solute-induced catalyst deactivation analyzed by carbon isotope fractionation, Applied Catalysts B: Environmental (2016) 188:77-86.

Hansson, E. B. et al., Formation of poorly crystalline iron monosulfides: Surface redox reactions on high purity iron, spectroelectrochemical studies, Corrosion Science (2006) 48:3767-3783.

Hansson, E. B. et al., Influence on Na2S on the degradation kinetics of CCl4 in the presence of very pure iron, Journal of Contaminant Hydrology (2008) 98:128-134.

Hassan, S. M., Reduction of halogenated hydrocarbons in aqueous media: I. Involvement of sulfur in iron catalysis, Chemosphere (2000) 40:1357-1363.

He, Y. T. et al., Review of Abiotic Degradation of Chlorinated Solvents by Reactive Iron Minerals in Aquifers, Groundwater Monitoring & Remediation (2015) 35(3):57-75.

Herbert, Jr., R. B. et al., Surface chemistry and morphology of poorly crystalline iron sulfides precipitated in media containing sulfate-reducing bacteria, Chemical Geology (1998) 144-87-97.

Jeong, H. Y. et al., Abiotic Reductive Dechlorination of cis-Dichloroethylene by Fe Species Formed during Iron- or Sulfate-Reduction, Environ. Sci. Technol. (2011) 45:5186-5194.

Kappes, M. et al., Reaction Paths of Thiosulfate during Corrosion of Carbon Steel in Acidified Brines, Journal of the Electrochemical Society (2012) 159(4):C195-C204.

Kennedy, L. G. et al., Field-scale demonstration of induced biogeochemical reductive dechlorination at Dover Air Force Base, Dover, Delaware, Journal of Contaminant Hydrology (2006) 88:119-136.

Kim, E.-J. et al., Facile Synthesis and Characterization of Fe/FeS Nanoparticles for Environmental Applications, Applied Materials & Interfaces (2011) 3:1457-1462.

Kim, E-J. et al., Remediation of Trichloroethylene by FeS-Coated Iron Nanoparticles in Simulated and Real Groundwater: Effects of Water Chemistry, Industrial & Engineering Chemistry Research (2013) 52:9343-9350.

Kim, E.-J. et al., Effects of Metal Ions on the Reactivity and Corrosion Electrochemistry of Fe/FeS Nanoparticles, Environ. Sci. Technol. (2014) 48:4002-4011.

Lee, W. et al., Abiotic Reductive Dechlorination of Chlorinated Ethylenes by Iron-Bearing Soil Minerals. 1. Pyrite and Magnetite, Environ. Sci. Technol. (2002) 36:5147-5154.

Lee, W. et al., Abiotic Reductive Dechlorination of Chlorinated Ethylenes by Iron-Bearing Soil Minerals. 2. Green Rust, Environ. Sci. Technol. (2002) 36:5348-5354.

Lee, W. et al., Reductive Capacity of Natural Reductants, Environ. Sci. Technol. (2003) 37:535-541.

Li, T. et al., Reductive Dechlorination of Trichloroethene and Carbon Tetrachloride Using Iron and Palladized-Iron Cathodes, Environ. Sci. Technol. (2000) 34:173-179.

Li, T. et al., Electrochemical Investigation of the Rate-Limiting Mechanisms for Trichloroethylene and Carbon Tetrachloride Reduction at Iron Surfaces, Environ. Sci. Technol. (2001) 35:3560-3565.

Li, X-Q. et al., Zero-Valent Iron Nanoparticles for Abatement of Environmental Pollutants: Materials and Engineering Aspects, Critical Reviews in Solid State and Materials Sciences (2006) 31(4):111-122.

Lim, T.-T. et al., Effects of anions on the kinetics and reactivity of nanoscale Pd/Fe in trichlorobenzene dechlorination, Chemosphere (2008) 73:1471-1477.

Lipczynska-Kochany, E. et al., Degradation of Carbon Tetrachloride in the Presence of Iron and Sulphur Containing Compounds, Chemosphere (1994) 29(7):1477-1489.

Lister, M. W. et al., Sodium Dithionite, Decomposition in Aqueous Solution and in the Solid State, Can. J. Chem. (1959) 37:1567-1574.

Liu, Y et al., TCE Dechlorination Rates, Pathways, and Efficiency of Nanoscale Iron Particles with Different Properties, Environ. Sci. Technol. (2005) 39:1338-1345.

Lojkasek-Lima, P. et al., Evaluating TCE Abiotic and Biotic Degradation Pathways in a Permeable Reactive Barrier Using Compound Specific Isotope Analysis, Groundwater Monitoring & Remediation (2012) 32(4):53-62.

Luther, III, G. W. et al., Inorganic and Organic Sulfur Cycling in Salt-Marsh Pore Waters, Science (1986) 232 (4751):746-749.

Macdonald, D. D. et al., The Corrosion of Carbon Steel by Wet Elemental Sulphur, Corrosion Science (1978) 18:411-425.

Martin, J. E. et al., Determination of the Oxide Layer Thickness in Core-Shell Zerovalent Iron Nanoparticles, Langmuir (2008) 24:4329-4334.

Mullet, M. et al., Surface chemistry and structural properties of mackinawite prepared by reaction of sulfide ions with metallic iron, Geochimica et Cosmochimica Acta (2002) 66(5):829-836.

Navy Facilities Engineering Command (NAVFAC), In Situ Biogeochemical Transformation Processes for Treating Contaminated Groundwater, Sep. 2014, 6 pages.

Oudar, J., Sulfur Adsorption and Poisoning of Metallic Catalysts, Catal. Rev.-Sci. Eng. (1980) 22(2):171-195.

* cited by examiner

SURFACE MODIFICATION OF ZERO VALENT IRON MATERIAL FOR ENHANCED REACTIVITY FOR DEGRADING CHLORINATED CONTAMINANTS IN WATER

CROSS-REFERENCE TO PROVISIONAL APPLICATION

This nonprovisional patent application claims the benefit under 35 U.S.C. § 119(e) of U.S. Provisional Patent Application Ser. No. 62/337,441, filed on May 17, 2016, entitled "Surface Modification of Zero Valent Iron Material for Enhanced Reactivity for Degrading Chlorinated Contaminants in Water". U.S. Provisional Patent Application Ser. No. 62/337,441 is incorporated herein by reference in its entirety.

TECHNICAL FIELD

Embodiments are related to water treatment techniques. Embodiments also relate to techniques and devices for degrading chlorinated compounds in water.

BACKGROUND

Many methods are employed for environmental remediation in areas contaminated with certain toxicants and/or pollutants. Currently, iron-based treatment is used in cleaning up such compounds as chlorinated solvents (e.g., PCE and TCE), pesticides (e.g., DDT), and heavy metals (e.g., mercury and lead). Adding a secondary metal enhances the reactivity of iron. The second metal serves as a catalyst, and therefore, reduction happens much quicker than with iron alone. However, these catalyst metals themselves are pollutants and very sensitive to the environment of the groundwater they are added to treat, that is, these catalyzed bimetallic zero-valent iron nanoparticles are easily deactivated by groundwater solutes.

In recent years, bulk or nano scale zero-valent iron (ZVI) has received much attention for their potential application for the treatment of contaminated soils and water. Most attention has been focused on their ability as a reductant or adsorbent in the remediation of chlorinated hydrocarbons and heavy metal contaminated groundwater. Chlorinated ethenes, including PCE and TCE, are among the most prevalent contaminants at the US superfund sites.

ZVI-mediated dechlorination under field conditions is relatively slow because, without the addition of catalyst additives, reaction rates are slow and there is a tendency to undergo surface passivation. Therefore, a small amount of catalyst metal, most commonly Ni or Pd, is incorporated. However, bimetallic iron is prone to catalyst deactivation. Additionally, bimetallic iron undergoes rapid iron corrosion in the presence of Pd in an aqueous environment that may result in a lack of treatment longevity and, therefore, lead to a decrease in remediation efficiency.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is therefore one aspect of the disclosed embodiments to provide for processes, systems, and compositions for treating a fluid such as water to reduce the amount or concentration of a contaminant (e.g., chlorinated solvents) in the fluid.

It is another aspect of the disclosed embodiments to provide for a method and system for bypassing the addition of secondary metals (e.g., noble metal catalyst) to zero-valent iron for environmental cleanup specific to contamination via chlorinated solvents.

It is also an aspect of the disclosed embodiments to provide fore the reductive dechlorination of trichloroethene by zero-valent iron nanoparticles: reactivity enhancement through sulfidation treatment.

It is a further aspect of the disclosed embodiments to provide for a facile aqueous-based surface treatment method to increase the reactivity of metal iron. This surface treatment method may be administered via the addition of common sulfur anions such as thiosulfate or via cultivation of biological sulfate reduction condition. The latter method is able to enhance the reactivity of zero-valent iron that has been installed at many groundwater remediation sites. Therefore, this facile aqueous-based surface treatment method is applicable to both existing and new ZVI installations.

It is yet another aspect of the disclosed embodiments to provide for a surface sulfidation treatment an alternative route to increase zero-valent iron (ZVI) materials' chemical reactivity, prolong their functional lives, and achieve better material stability in the groundwater environment.

It is also an aspect of the disclosed embodiments to provide for the use of sulfur compounds in the context of a surface treatment that eliminate the use of precious metal catalysts.

It is also an aspect of the disclosed embodiments to provide for a surface sulfidation treatment applicable to a wide variety of commercial iron products (e.g., iron filings, granules, and powders).

It is another aspect of the disclosed embodiments to provide for a sulfidation treatment as an alternative to unmodified iron and iron catalyzed with metals (i.e., Pd or Ni).

It is yet another aspect of the disclosed embodiments to provide for a surface sulfidation treatment that is applied to iron.

The aforementioned aspects and other objectives and advantages can now be achieved as described herein. Methods and systems are disclosed herein for degrading chlorinated compounds in water. A facile aqueous-based surface treatment can be provided with respect to iron to increase the reactivity of a zero-valent iron material for degrading chlorinated compounds in the water without the use of a noble metal catalyst. Such a facile aqueous-based surface treatment can be implemented as a surface sulfidation pre-treatment with respect to the iron. The disclosed facile aqueous-based surface treatment increases reactivity utilizing sulfur compounds for use in the degradation of the chlorinated compounds in the water.

Conventional iron material is slow at degrading chlorinated contaminants. The disclosed embodiments significantly increases the reactivity of iron using inexpensive sulfur compounds via a simple treatment method. This approach can eliminate the use of precious metal catalysts. The disclosed treatment is applicable to a wide variety of commercial iron products (e.g., iron filing/granule/powder etc.). The disclosed treatment procedure is also readily amenable to scaling-up, and air-exposure experiments suggest that the reactive properties after the sulfidation can be preserved in air for a long period of time saving the use of sophisticated instruments or handling process during the production, transfer, and use of these reactive iron materials.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
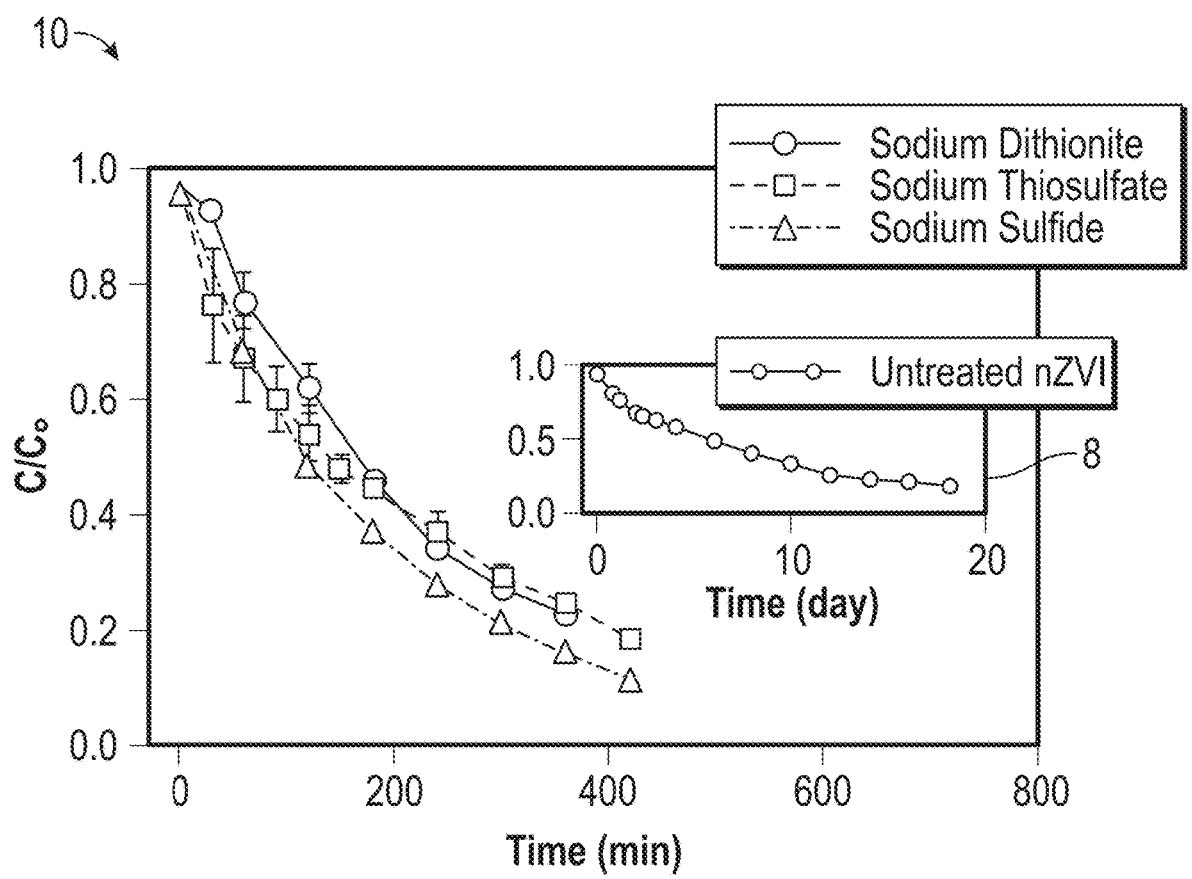
FIG. 1 illustrates a graph depicting data indicative of TCE dechlorination by S-nZVI prepared using different sulfidation reagents, in accordance with an example embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, 'or' if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms such as "a," "an," or "the," again, may be understood to convey a singular usage or to convey a plural usage, depending at least in part upon context. In addition, the term abased on may be understood as not necessarily intended to convey an exclusive set of factors and may, instead, allow for existence of additional factors not necessarily expressly described, again, depending at least in part on context.

As indicated previously, many methods are employed for environmental remediation in areas contaminated with certain toxicants and/or pollutants. Currently, iron-based treatment is used in cleaning up such compounds as chlorinated solvents (e.g., PCE and TCE), pesticides (e.g., DDT), and heavy metals (e.g., mercury and lead). Adding a secondary metal enhances the reactivity of iron. The second metal serves as a catalyst, and therefore, reduction happens much quicker than with iron alone. However, these catalyst metals themselves are pollutants and very sensitive to the environment of the groundwater they are added to treat, i.e., these catalyzed zero-valent iron-bimetallic nanoparticles are easily deactivated by groundwater solutes.

The disclosed embodiments bypass the addition of secondary metals (e.g., noble metal catalyst) to zero-valent iron for environmental cleanup specific to contamination via chlorinated solvents (e.g., groundwater remediation, soil vapor intrusion mitigation, and wastewater decontamination). This approach achieves such by using a facile aqueous-based surface treatment method to increase the reactivity of metal iron. Surface sulfidation claims to offer a new class of iron nanoparticles capable of attaining a good balance between chemical reactivity and material stability.

In recent years, bulk or nano scale zero-valent iron (ZVI) has received much attention for their potential application for the treatment of contaminated soils and water. Most attention has been focused on their ability as a reductant or an absorbent in the remediation of chlorinated hydrocarbons and heavy metal contaminated groundwater. Chlorinated ethenes, including PCE and TCE, are among the most prevalent contaminants at the US superfund sites.

ZVI-mediated dechlorination under field conditions is relatively slow because, without the addition of catalyst additives, reaction rates are slow and there is a tendency for ZVI to undergo surface passivation. Therefore, a small amount of catalyst metal, most commonly Ni or Pd, is incorporated. However, bimetallic iron is prone to catalyst deactivation. Additionally, bimetallic iron undergoes rapid iron corrosion in the presence of Pd in an aqueous environment that may result in a lack of treatment longevity and, therefore, lead to a decrease in remediation efficiency.

Compared to unmodified iron, the addition of reduced sulfur precursors in the lab has enhanced dehalogenation reactivity. The overall idea of using sulfur to increase the effectiveness of ZVI is not novel in itself (See Reference 5 and 6), and is seen when ZVI are added to areas that naturally have levels of sulfur in the environment. However, recent literature noting sulfur pre-treatments in remediation scenarios is differentiated from this disclosed technology (See References 1, 2, and 4). Sulfide or dithionite were used in the previous studies, whereas in this technology, thiosulfate is shown to be as effective as the other sulfur reagents without incurring high costs or safety concerns. In addition, this technology uses low doses of sulfur reagents as opposed to high doses used in the literature. Furthermore, multiple sulfidation treatment protocols are described in this technology. Reference 3 speaks to the difference in catalyst deactivation between Pd—Fe and Ni—Fe bimetallic nanoparticles, suggesting that sulfur may play a role in reactivity.

The disclosed embodiments are based on the finding that the optimal S:Fe mole ratio is 0.01 to 0.001 for its facile aqueous-based sulfur compound surface treatment (sulfide or sulfur oxyanions such as thiosulfate). The treatment procedure is readily amenable to scaling-up.

Prior art approaches have discussed sulfur-modified iron added to water as a whole for remediation. However, no known current literature speaks specifically to the disclosed technology's use of sulfidation as a surface pre-treatment in dechlorination of contaminated water. Meaning, the role of sulfur in promoting the activity of iron has not been established in this way and for this specific use. Therefore, this type of applicability of surface sulfidation treatment to ZVI used in the remediation industry may be patentable and commercially useful.

Specifically, the disclosed embodiments reveal that surface sulfidation treatment is an alternative route to increase ZVI materials' chemical reactivity, prolong their functional lives, and achieve better material stability in the groundwater environment. Also, sulfur compounds are relatively inexpensive and the surface treatment would potentially eliminate the use of precious metal catalysts. Moreover, this surface sulfidation treatment may be applicable to a wide variety of commercial iron products (e.g., iron filings, granules, and powders). Thus, the disclosed embodiments involve a sulfidation treatment as an alternative to unmodified iron and iron catalyzed with metals (e.g., Pd or Ni).

In general, zero-valent iron nanoparticles (nZVI) synthesized in the presence of reduced sulfur compounds have been shown to degrade trichloroethene (TCE) at significantly higher rates. However, the applicability of sulfidation as a general means to enhance nZVI reactivity under different particle preparation conditions and the underlying cause for this enhancement effect are not well understood. In this study, the effects of sulfidation reagent, time point of sulfidation, and sulfur loading on the resultant particles were assessed through TCE degradation experiments. Up to 60-fold increase in TCE reaction rates was observed upon sulfidation treatment with products being fully dechlorinated hydrocarbons. While the reactivity of these sulfur-treated nZVI (S-nZVI) was relatively unaffected by the sulfidation reagent (viz., sodium sulfide, dithionite, or thiosulfate) or the sequence of sulfidation relative to iron reduction, TCE reaction rates were found to depend strongly on sulfur to iron ratio. At a low sulfur loading, TCE degradation was accelerated with increasing sulfur dose. The rate constant reached a limiting value, however, as the sulfur to iron mole ratio was greater than 0.025. Different from previous propositions that iron sulfidation leads to more efficient TCE or tetrachloroethene (PCE) degradation by enabling depassivation of iron surface, affording catalytic pathways, or facilitating electron transfer, we show that the role of sulfur in nZVI lies essentially in its ability to poison hydrogen recombination, which drives surface reactions to favor reduction by atomic hydrogen. This implies that the reactivity of S-nZVI is contaminant-specific and is selective against the background reaction of water reduction. As the effect of sulfur manifests through surface processes, sulfidation represents a broadly applicable surface modification approach to modulate or increase the reactivity of nZVI for treating TCE and other related contaminants.

Due to widespread historical applications in a broad range of industrial and commercial processes and their persistence against natural attenuation, trichloroethene (TCE) and tetrachloroethene (PCE) in the form of dissolved chemicals or non-aqueous phase liquid (NAPL) are the most frequently encountered contaminants at the U.S., superfund sites. Compared to microbial-mediated reduction of PCE and TCE, which tends to produce toxic intermediates such as dichloroethenes (DCEs) and vinyl chloride (VC), abiotic dechlorination undergoes predominantly a reductive elimination pathway to yield completely dechlorinated products of benign nature (e.g., acetylene, ethene, or ethane). With recently reported TCE and PCE transformation by reduced iron minerals under field conditions, there is a surge of interest in using indigenous or engineered abiotic materials to improve the remediation performance of sites impacted by chlorinated ethenes. To this end, two broad categories of iron materials have been evaluated. Ferrous-containing minerals such as iron sulfides (e.g., mackinawite or pyrite), magnetite, and green rust are able to reduce chlorinated ethenes to acetylene. These Fe(II)-containing minerals are naturally present in subsurface soils, or their formation can be stimulated under conditions favorable for biologically mediated sulfate or Fe(III) reduction in processes known as in situ biogeochemical treatment. However, reductive dechlorination on ferrous minerals is relatively slow and the minerals appear to possess limited reduction capacities, thus it requires high mass loadings of the solids to outcompete the less desirable biological reduction pathways. Another form of iron materials extensively studied for the degradation of chlorinated ethenes is zero-valent iron (ZVI). Various forms of ZVI, including iron granules and powder, colloidal iron nanoparticles (nZVI), and bimetallic iron carrying a small amount of catalyst metal (e.g., Pd—Fe and Ni—Fe) have been studied in the past. In spite of the intrinsic reactivity of ZVI materials, corrosion of iron in aqueous solutions causes spontaneous surface passivation and the catalyst additives on ZVI are prone to deactivation by common groundwater solutes.

Recent studies have reported enhanced reactivity of ZVI towards chlorinated contaminants in the presence of sulfur compounds. For example, it has been observed that iron filings containing sulfur impurities were more efficient at TCE degradation than high purity iron. Butler and Hayes noted enhanced reduction of chlorinated ethenes when the reaction mixture was amended with sulfide ion. By adding sodium dithionite into the synthesis broth of nZVI, a Fe/FeS nanocomposite material has been created with up to 20-fold increases in TCE removal rates. Similarly, iron nanoparticles that had been conditioned in dilute sulfide or dithionite solutions were found to degrade TCE and 1,2-dichloroethane more rapidly. While multiple explanations have been postulated on the origin of the enhanced reactivity caused by iron sulfidation, including a catalytic effect ascribed to the iron sulfides formed on the particle surface, more efficient charge transfer mediated by the sulfides, and increased depassivation of iron surface, these views remain largely hypothetical awaiting experimental verification. Moreover, variations in experiment conditions, type of iron substrates used, and sulfidation procedures in these studies preclude the identification of critical factors controlling the reactivity of sulfur-modified iron. As a result, the broader implications of sulfidation as a means to increase the performance of ZVI materials for the treatment of chlorinated contaminants are unclear.

An objective of the disclosed embodiments was to examine the effects of sulfidation on the physicochemical characteristics of nZVI and their reactivity in TCE dechlorination experiments. Our choice of nanosized ZVI stems from their consistent quality and an ability to manipulate particle synthesis conditions to accommodate different sulfidation procedures. While the focus of the present study was on nZVI, our ongoing investigations suggest that sulfidation is applicable to other forms of iron materials such as commercial ZVI products, thus the findings presented here will lend relevant insights into the general role of sulfur in modulating the reactivity of ZVI materials.

Deoxygenated deionized-distilled water (DDI), prepared by purging DDI with $N_2$ for 30 min, was used in experimental embodiments including material synthesis and TCE dechlorination experiments. nZVI was synthesized using the borohydride reduction method. Sulfur-treated nZVI particles (denoted as S-nZVI) were prepared using two approaches. The first involves amending an appropriate amount of sulfidation reagent to an Fe(III) solution prior to the addition of borohydride and is referred to as pre-synthesis S-nZVI. Three common sulfur compounds were evaluated as sulfidation reagents in this study, namely, sodium sulfide ($Na_2S$), sodium dithionite ($Na_2S_2O_4$), and sodium thiosulfate ($Na_2S_2O_3$). The dose of the sulfur compound was varied such that the mole ratio of the sulfur reagent to the initial concentration of ferric salt in the synthesis mixture (denoted as S/Fe mole ratio) was the range of $1.25 \times 10^{-3}$ to 0.75. In the second approach, a sulfidation reagent was dosed into the synthesis mixture at 20 minutes after the onset of Fe(III) reduction via the addition of borohydride. The resultant particles are denoted as post-synthesis S-nZVI. Amorphous iron sulfide (FeS) was synthesized in the lab. All iron sulfide or sulfided iron particles were used immediately in subsequent experiments upon preparation.

To investigate the mechanism of sulfur-induced reactivity improvement, a small amount of arsenic-modified nZVI was prepared following the same post-synthesis method as that of S-nZVI, except that the sulfur compound (sodium thiosulfate) was replaced with equivalent moles of sodium arsenite ($NaAsO_2$).

Batch TCE dechlorination experiments were performed to compare the reactivity of S-nZVI prepared under different conditions. All experiments were conducted in 45-mL EPA vials containing 30 mL of aqueous solution and the balance as headspace. The initial pH of all solutions was adjusted to between 7.8-8.2 using dilute NaOH or HCl to simulate the typical pH in groundwater. The solutions were amended with, for example, 5 g/L of particles (dry weight). The vials were capped with PTFE-lined mininert valves. Experiments were started by injecting a small volume of TCE stock solution in methanol to reach an initial TCE concentration of, for example, 25 mg/L. The reactors were placed on a wrist-action shaker at 250 rpm at $22+/-1°$ C. Control experiments without iron materials or with unmodified nZVI were performed in parallel. Periodically, an aliquot (e.g., 25-50 μL) of headspace gas was withdrawn using a gastight syringe. The samples were directly injected into a GC-FID system (Agilent 6890) equipped with an Agilent PoraPlot Q column (e.g., 25 m×0.32 mm) to analyze for the concentrations of TCE, chlorinated intermediates (not detected in this study), acetylene, ethene, ethane, and longer chain hydrocarbons (up to $C_6$). This approach can provide adequate separation between TCE and the daughter products. TCE calibration line was constructed by headspace analysis of TCE aqueous standard solutions prepared in the same type of vials as the experimental reactors. Calibrations for $C_2$-$C_6$ hydrocarbons were performed using commercial gas standards. The results were used to compute their total concentrations in the reaction vials after accounting for partition between headspace and aqueous phases using the respective Henry's Law constants. Details on $H_2$ evolution measurements and isotope fractionation analysis of TCE during reactions with S-nZVI were then compiled. The solids were subject to microscopic, crystallographic, and surface chemistry characterizations.

FIG. 1 illustrates a graph 10 depicting data indicative of TCE dechlorination by S-nZVI prepared using different sulfidation reagents, in accordance with an example embodiment. The initial mole ratio of sulfidation reagent to iron was fixed at 0.05. Initial TCE concentration was 25 mg/L. The inset shows TCE degradation by fresh nZVI without sulfidation treatment. The particle dose was 5 g/L in all experiments.

Thus, the effect of sulfidation reagent on the reactivity of nZVI for TCE dechlorination was evaluated and the results shown in graph 10 of FIG. 1. The particles shown in FIG. 1 were prepared using different sulfur compounds at a constant S/Fe mole ratio of 0.05 following the post-synthesis sulfidation procedure. As a comparison, the inset 8 of FIG.

1 shows TCE degradation by fresh nZVI prepared under equivalent conditions but without exposure to any sulfur reagent. It is evident that all sulfur-amended nZVI displayed remarkable improvements in TCE dechlorination rates. The observed mass-normalized pseudo-first-order reaction rate constants ($k_m$) of various s-nZVI were approximately 60 folds higher than that of the untreated nZVI (Table 1). Distribution of products was qualitatively similar among different S-nZVI, with ethene being the dominant product, accompanied by lesser amounts of ethane, acetylene, and heavier hydrocarbons (mixture of $C_3$-$C_6$ alkanes and alkenes) (Table 1), Dichloroethene isomers (DCEs) and vinyl chloride (VC), common intermediates generated by hydrogenolysis reactions, were not detected in nZVI or S-nZVI systems during the course of experiments, which agrees with prior studies that reduction of TCE on abiotic surfaces occurs predominantly via a dichloro-elimination pathway bypassing the formation of chlorinated intermediates.

In prior studies, dithionite and sulfide ions have been employed to restore the reactivity of passivated ZVI or to synthesize Fe(0)/FeS nanocomposite materials. Aqueous sulfide (as $H_2S$ or $HS^-$ at near neutral pH) is a corrosive chemical and its attacking on iron results in deposition of a layer of iron sulfide (FeS) on the surface. Hydrolysis of dithionite in acidic solutions gives rise to thiosulfate and sulfite (R1). At an alkaline pH, dithionite may hydrolyze via another pathway producing sulfite and sulfide (R2). Disproportionation of thiosulfate leads to the formation of elemental sulfur and sulfite (R3). Elemental sulfur may react with iron directly (R4) or convert to sulfide that subsequently binds with iron to form FeS. As FeS is cathodic to Fe(0), its formation propels further corrosion of Fe(0).

$$2S_2O_4^{2-}+H_2O \rightarrow S_2O_3^{2-}+2HSO_3^- \quad (R1)$$

$$S_2O_4^{2-}+6OH^- \rightarrow 5SO_3^{2-}+S^{2-}+3H_2O \quad (R2)$$

$$S_2O_3^{2-} \rightarrow S^0+SO_3^{2-} \quad (R3)$$

$$Fe(0)+S^0 \rightarrow FeS \quad (R4)$$

In principle, sulfidation of the ZVI material can be achieved with the use of either thiosulfate, dithionite, or free sulfide. Dithionite is a fairly strong reductant, especially under alkaline pH, for which it has been proposed as a reductant to prepare nZVI. Thiosulfate does not have an as strong reducing capability, but it readily decomposes to release elemental sulfur or sulfide (R3), and the former is reduced in the presence of Fe(0) to sulfide. Thus, thiosulfate effectively serves as a source of sulfide in aqueous nZVI suspension. The sulfide salt used, $Na_2S$, is highly hygroscopic and tends to absorb moisture and $CO_2$ in the air, posing material storage and handling difficulties. Furthermore, the rapid release of toxic fume upon addition of a sulfide chemical raises process safety concerns. In field applications, the above considerations are significant enough to justify the choice of dithionite or thiosulfate. Considering the availability of thiosulfate (both as a synthetic chemical and a naturally occurring sulfur compound) and the concerns that excess dose of dithionite may consume Fe(0), thiosulfate was chosen as the sulfidation reagent in all subsequent experiments.

Figure 2:
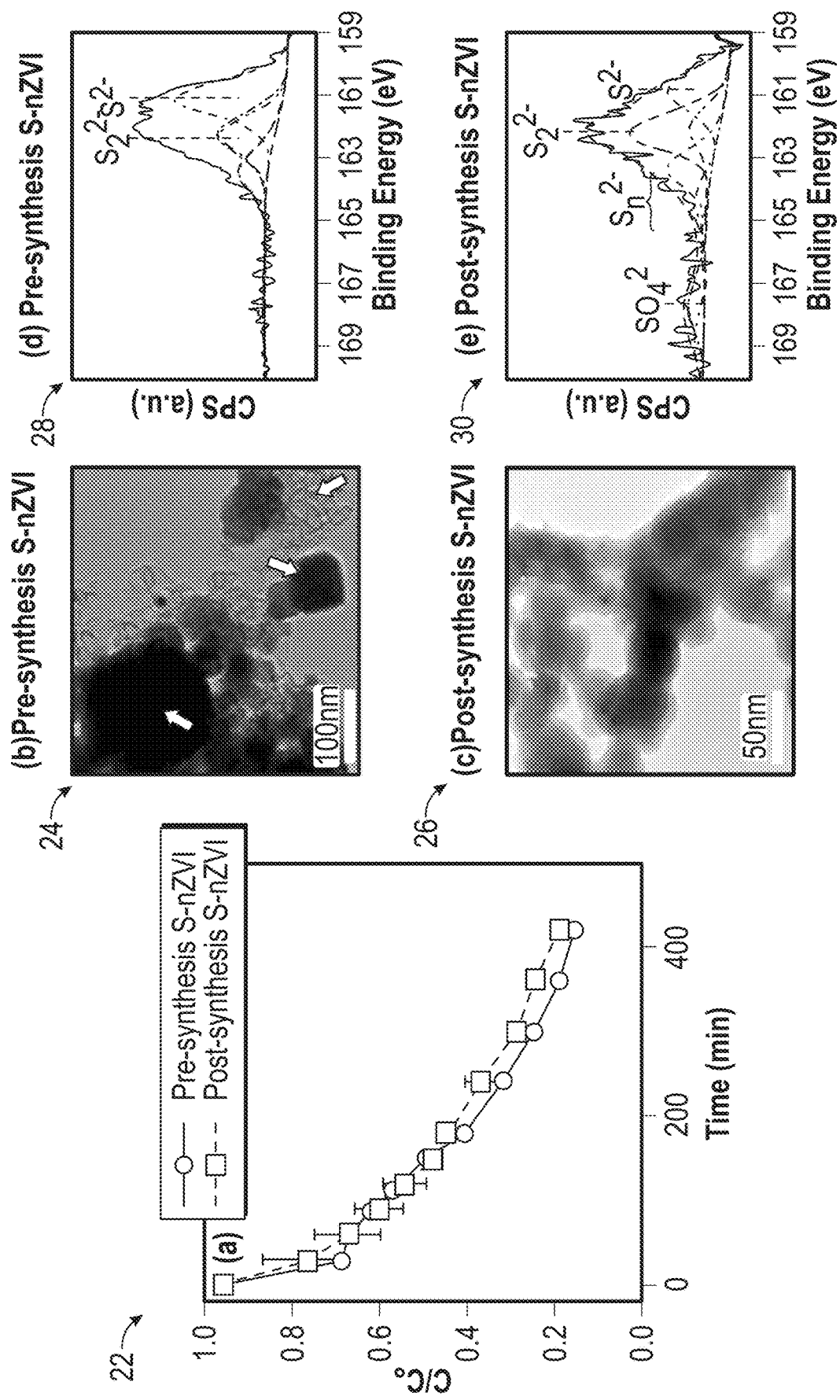
FIG. 2 illustrates a graph depicting data indicative of TCE dechlorination by S-nZVI that receives sulfidation treatment at different stages of particle synthesis, and TEM micrographs of the particles used, in accordance with an example embodiment.

FIG. 2 illustrates a graph 22 indicative of TCE dechlorination by S-nZVI that receives sulfidation treatment at different stages of particle synthesis, as shown in images 24 and 28, in accordance with an example embodiment. FIG. 2 further depicts TEM micrographs 28 and 30 of the particles used in graph 22. The micrographs 28 and 30 depict XPS S 2p$_{3/2}$ spectra of the corresponding particles in graph 22. All materials were prepared with a S/Fe mole ratio of 0.05.

In prior methods, dithionite was introduced into the synthesis solutions prior to Fe(III) reduction by borohydride. More recently, post-synthesis sulfidation involving reacting pre-formed nZVI in sulfide solutions has been employed. To assess whether the time point of sulfidation exerts an effect on the nature of the particles formed, we prepared pre- and post-synthesis S-nZVI using thiosulfate at the same S/Fe mole ratio (0.05). The morphology of the solids emerging from the two preparations was considerably different. Under TEM, the pre-synthesis S-nZVI consists of a heterogeneous mixture of spherical particles that are typical of solution-derived iron nanoparticles (indicated by a white arrow) together with some cubic (red arrow) and platy (blue arrow) structures that resemble iron sulfides or oxides (e.g., see image 24 of FIG. 2). In contrast, the post-synthesis S-nZVI sample shown in image 26 in FIG. 2 shows more uniform structure characterized by spherical particles aggregating in string-like clusters. The appearance was akin to that of the unmodified nZVI prepared in our earlier studies. The surface chemistry of the pre- and post-synthesis S-nZVI was analyzed with X-ray photoelectron spectroscopy (XPS).

The S 2p spectra of pre- and post-synthesis S-nZVI are shown in graphs 28 and 30 in FIG. 2. The spectra were fitted with S 2p$_{3/2}$ and S 2p$_{1/2}$ spin-orbit doulets that are separated by 1.2 eV with an intensity ratio of 2:1. Peak assignment was based on literature reported binding energies of sulfide minerals and the spectra of reference materials acquired under the same conditions as the samples. Pre-synthesis S-nZVI carried predominantly monosulfide ($S^{2-}$) and disulfide ($S_2^{2-}$), accounting for 63 and 37 atomic percents (at. %) of total sulfur species, respectively. The surface of post-synthesis S-nZVI is composed mainly of $S^{2-}$ (34 at. %) and $S_2^{2-}$ (46 at. %), with $S_2^{2-}$ contributing a higher portion than that in the pre-synthesis S-nZVI. The post-synthesis sample also features a group of low-rising peaks in a binding energy range of 163.3-164.3 eV, corresponding to polysulfides ($S_n^{2-}$) and possibly elemental sulfur, and a sulfate ($SO_4^{2-}$) component at the highest binding energy (167.6 eV). Comparison of the two S 2p spectra suggests that oxidation of the sulfur precursor has occurred to a greater extent during the post-synthesis sulfidation process.

X-ray diffraction analysis can be utilized to detect the presence of Fe(0) and magnetite in both types of S-nZVI, with the post-synthesis S-nZVI exhibiting a lower degree of crystallinity due to broadening of diffraction peaks. No mono-, di-, or polysulfides of iron can be discerned in the diffraction spectra, which in conjunction with the XPS analysis confirms that sulfide formation on the surface is amorphous. This observation is consistent with the notion that rapid corrosion of iron in sulfidic water tends to produce poorly ordered iron sulfides.

We noticed that post-synthesis S-nZVI can be efficiently separated from the aqueous phase through a filtration step, while the pre-synthesis S-nZVI had a significant portion of the solids passing through a 0.2 µM filter. This observation was likely caused by a tendency of post-synthesis nZVI to form aggregates and the presence of fine, loose iron sulfide or oxide particles in the pre-synthesis S-nZVI as suggested by TEM images.

In spite of significant structural differences, the two forms of S-nZVI exhibit similar reactive behavior in TCE dechlorination experiments. $k_m$ for pre-synthesis and post-synthesis S-nZVI was 0.9±0.1×10$^{-3}$ and 0.8±0.05×10$^{-3}$ L/g-min, respectively, and the product composition matches closely with each other (Table 1). In view of the uniform texture of particles prepared via the post-synthesis method and their amenability to fast solid/liquid separation, this method was adopted to produce S-nZVI in all subsequent experiments.

Figure 3:
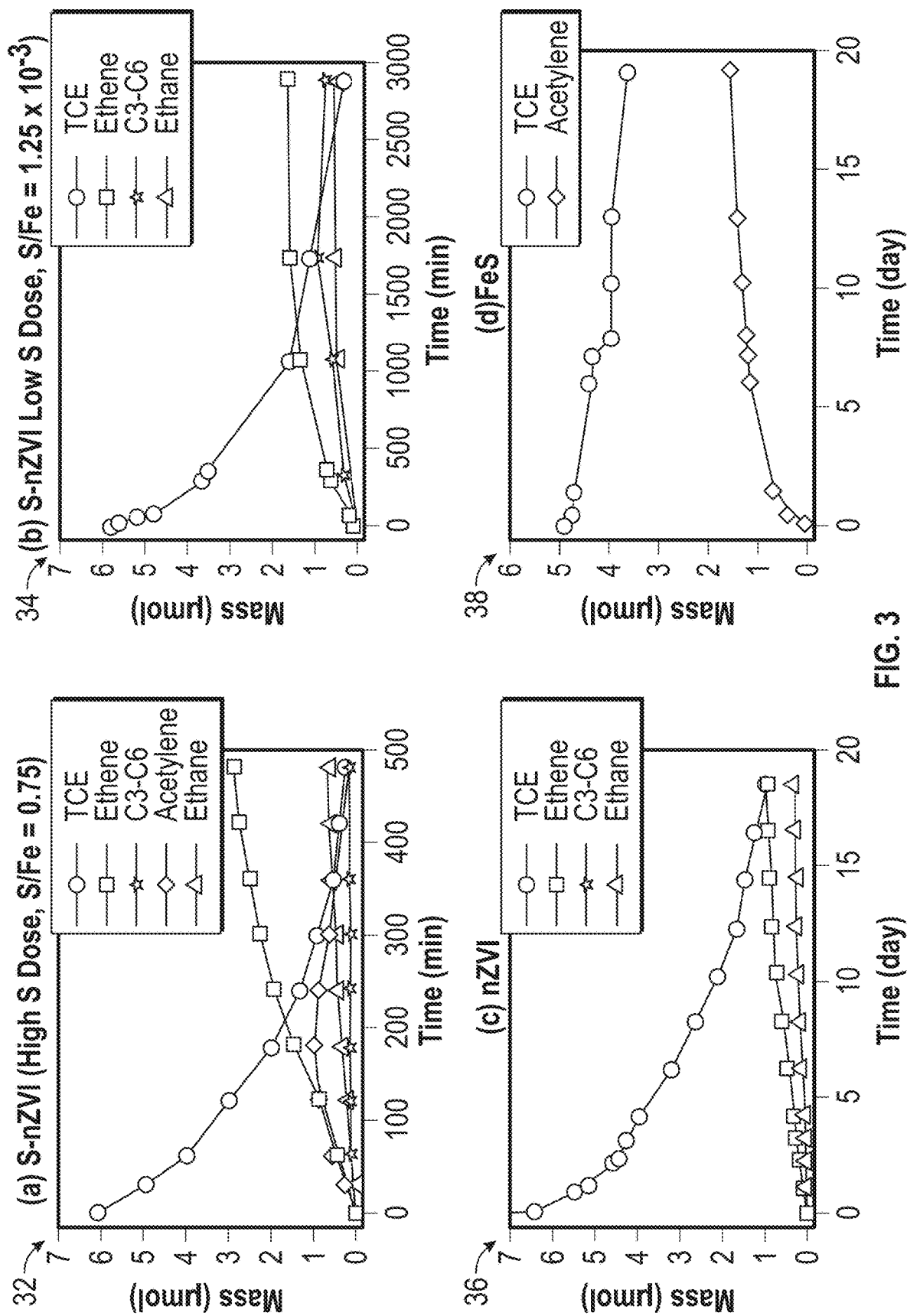
FIG. 3 illustrates graphs depicting data indicative of TCE dechlorination and product formation in reactor of S-nZVI with low sulfur dose, S-nZVI with high sulfur dose, and unmodified nZVI, and FeS, in accordance with an example embodiment.

FIG. 3 illustrates graphs 32, 34, 36, and 38, respectively, plotting data regarding S-nZVI with high sulfur dose, S-nZVI with low sulfur dose, unmodified nZVI, and FeS. Note that in these experimental embodiments, the particle dose was 5 g/L. A series of S-nZVI were prepared using different doses of thiosulfate such that the S/Fe mole ratio in the synthesis solutions varied in the range of $125 \times 10^{-3}$ to 0.75. The concentration of thiosulfate after S-nZVI synthesis was measured, and the amount of sulfur deposited on nZVI, estimated based on thiosulfate consumption, correlates well with the initial S/Fe mole ratio. It was found that the loading of sulfur on iron has a strong impact on TCE degradation rates. With particles prepared using the highest sulfur dose (S/Fe=0.75, FIG. 3a), ethene and ethane were the dominant products, accounting for 70% and 17%, respectively, of total products identified (product yields were determined at approximately 90% TCE conversion).

Close inspection of graph 32 of FIG. 3 indicates there was an accumulation of acetylene during the initial phase of the reaction, nonetheless, its concentration declined over time accompanied by concurrent increases in ethene and ethane concentrations. Partially dechlorinated intermediates (i.e., DCEs or VC) were not detected in the headspace mixture. $C_3$-$C_6$ hydrocarbons contributed to a minor fraction (11%) of the products formed. In comparison, particles treated with the lowest sulfur dose, corresponding to a S/Fe mole ratio of $1.25 \times 10^{-3}$, produced ethene, ethane, and $C_3$-$C_6$ products (see graph 34 of FIG. 3), and acetylene was below detection limit at any sampling point.

Overall, a carbon recovery (as $C_2$ equivalent) of 50% to 90% was achieved for all S-nZVI used in this study. Incomplete carbon recovery has-been noticed in prior studies of TCE dechlorination using nZVI or iron sulfide materials. As noted in later discussion, the missing carbon is likely products of acetylene polymerization reactions, which are affinitive to metal surfaces, thus their quantities cannot be reliably measured using the headspace sampling method.

The results of control experiments, namely the reactions of TCE with unmodified nZVI and pure FeS prepared from aqueous precipitation, are shown in graphs 36 and 38 of FIG. 3. Greater than 90% TCE degradation was achieved within a time frame of 0.3 to 2 days when S-nZVI was the reductant, whereas it required 21 days to attain a similar extent of TCE removal by nZVI. Degradation of TCE in FeS suspension was even slower, with only 25% TCE being degraded in 19 days. The apparent mass-normalized reaction rates of various solids vary by approximately three orders of magnitude (Table 1). The composition of product mixture is similar for the original nZVI and those receiving a low dose of sulfur (see graphs 34 and 36). At a high sulfur dose, considerable accumulation of acetylene during the intermediate stage of the reaction was observed and ethene was the dominant final product (see graph 32 of FIG. 3). Contrary to nZVI or S-nZVI, TCE degradation by FeS yielded exclusively acetylene. This slow transformation of TCE to acetylene by FeS without further hydrogenation of acetylene agrees with earlier findings by other investigators.

Figure 4:
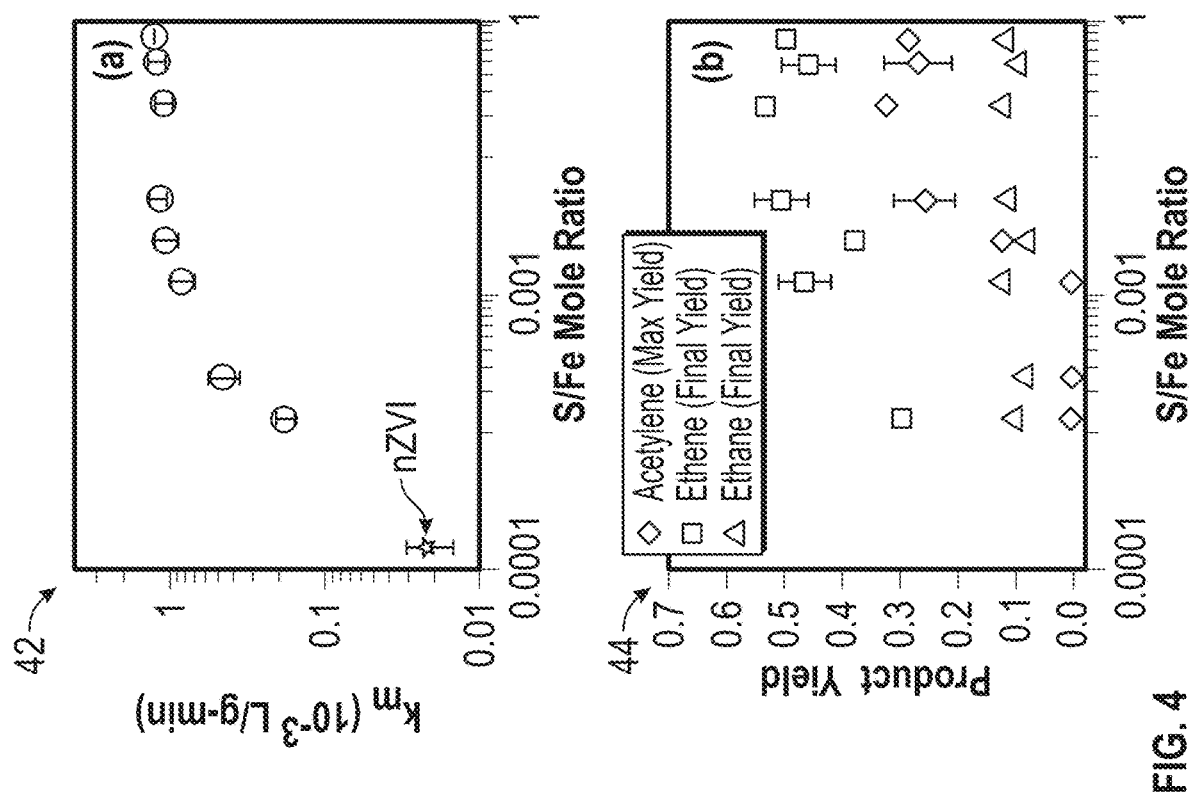
FIG. 4 illustrates graphs depicting data indicative of the effect S/Fe mole ratio on TCE degradation rate and product yields, in accordance with an example embodiment.

FIG. 4 illustrates graphs 42 and 44 that include data indicative of the effect of S/Fe mole ratio on TCE degradation rate and product yields. In these experimental embodiments, the particle dose was 5 g/L. As all TCE degradation data conform to a first-order rate model, the effect of sulfur loading on TCE reduction kinetics was assessed by plotting the mass-normalized rate constant, $k_m$, against the S/Fe mole ratio. The results, shown in graph 42 in FIG. 4, reveal a biphasic trend. When thiosulfate was applied at a small dose (S/Fe<0.025), more rapid TCE dechlorination occurred with increasing S/Fe ratio. However, when the S/Fe mole ratio exceeds 0.025, the rate constant levels out approaching a limiting value with increasing sulfur loading. The highest rate constant was $1.3 \times 10^{-3}$ L/g-min in comparison to $2.2 \times 10^{-5}$ and $1.5 \times 10^{-6}$ L/g-min achieved by unmodified nZVI and FeS, respectively. The effect of S/Fe ratio on product distribution is depicted in graph 44 in FIG. 4.

The final yields of ethene or ethane, defined as the amount of product formed over TCE consumed determined at the point of 90% TCE conversion, do not bear a strong correlation with the S/Fe ratio. However, the maximum accumulation of acetylene during the course of TCE transformation is strongly affected by the sulfur dose. For particles prepared under a low sulfur loading condition (S/Fe<0.025), no acetylene was detected in the product mixture, whereas particles containing a higher sulfur dose caused a substantial buildup of acetylene before its gradual conversion to downstream products.

Acetylene is a reactive chemical and it readily undergoes polymerization reactions on metal surfaces to form longer chain hydrocarbons, or in the presence of a hydrogen source, hydrogenates to more saturated products. Our separate experiments reacting acetylene with nZVI and S-nZVI confirm that both solids are able to rapidly transform acetylene into ethene, ethane, and higher order hydrocarbons (FIG. S3). Notably, significant gaps in carbon recovery were also observed during these reactions, which was attributed to deposition of non-volatile polymerized products (>$C_6$) on the particle surface. FeS, as expected from previous studies, did not show any appreciable reaction with acetylene. The composition of TCE daughter products and the reactivity of acetylene towards different iron materials suggest that TCE reduction on nZVI, S-nZVI, or FeS shares an identical pathway of β-elimination leading to acetylene formation.

Figure 5:
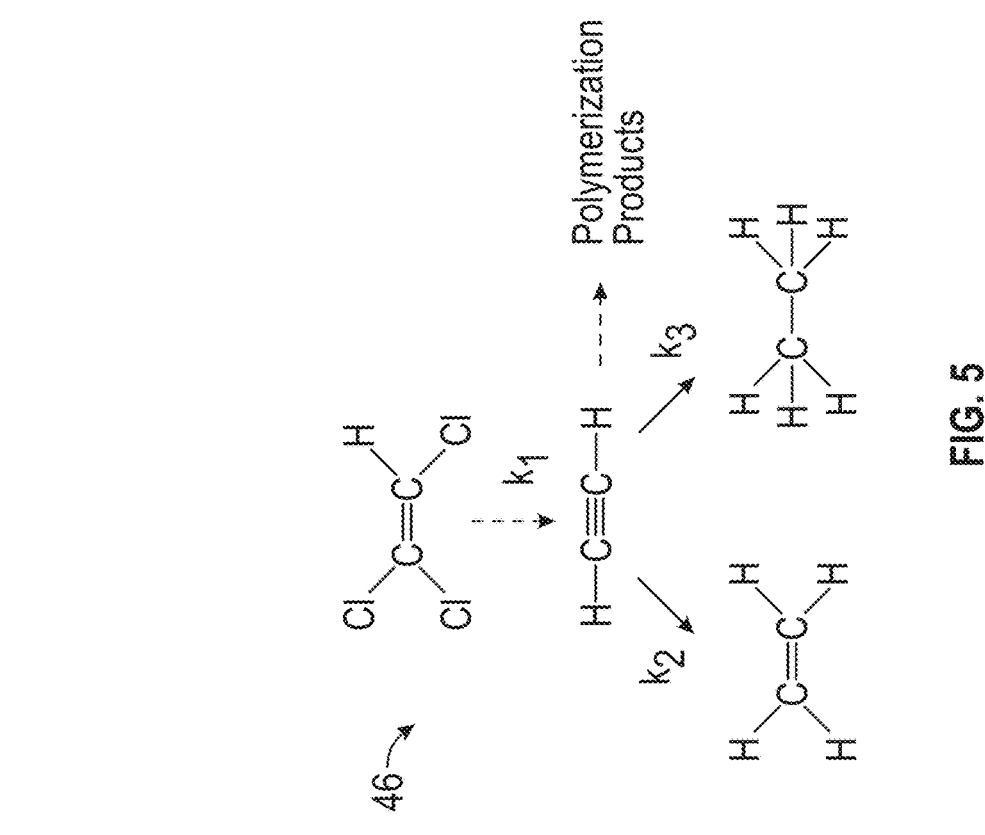
FIG. 5 illustrates a diagram of reaction pathways of TCE decomposition on S-nZVI, in accordance with an example embodiment.

FIG. 5 illustrates a diagram depicting potential reaction pathways 46 of TCE decomposition on S-nZVI, in accordance with an example embodiment. Only experimentally observed intermediates or products are shown. Dashed line indicates possible involvement of multiple reaction steps. Values of reaction rate constants ($k_1$-$k_3$) are tabulated in Table 2.

In the presence of nZVI or S-nZVI, acetylene is further converted to ethene, ethane, and higher order hydrocarbons, while it remains intact on FeS. The reaction pathway and its pertinent kinetic parameters are shown schematically in FIG. 5. Although multiple steps are involved in TCE transformation to acetylene, including surface adsorption of TCE and conversion of chloroacetylene (i.e., the immediate product of TCE elimination) to acetylene, the rate of these sequential steps can be captured by a single kinetic parameter ($k_1$) that represents the rate-limiting step.

Note that in FIG. 5 we consider ethene and ethane as being formed via two parallel pathways instead of going through sequential hydrogenation because ethene hydrogenation by nZVI or S-nZVI was exceedingly slow and the ratio of ethene to ethane remained constant during TCE degradation. The values of rate constants in FIG. 5 were estimated from TCE reduction and acetylene hydrogenation data and are summarized in Table 2. It is interesting to note that sulfidation of nZVI effectively increases the value of but the treatment has no enhancement effect on $k_2$ or $k_3$ value. Thus, the effect of sulfidation is specific for TCE conversion to acetylene and it does not accelerate the subsequent hydrogenation steps.

A pertinent question then arises on why the incorporation of sulfur into nZVI substrate would cast such a prominent effect on TCE dechlorination. Earlier studies suggest that reduced sulfur compounds such as free sulfide and dithionite are able to depassivate iron surface by reducing Fe(III) to Fe(II) leading to disintegration of the native oxide layer and/or the formation of Fe(II)-containing oxides (e.g., magnetite) that have greater charge transfer abilities. Depassivation effect alone is, however, unable to account for our findings here, since treating nZVI with dilute acid or amending the nZVI suspension with ascorbate (a reductant of Fe(III)) did not bring about substantial improvements in TCE reduction rates compared to the freshly synthesized particles.

This suggests that the presence of sulfided iron is necessary to enable the large increases in TCE degradation rates. It has been proposed that iron sulfide may catalyze PCE or TCE reduction by ZVI. Nevertheless, our analysis of carbon isotope fractionation during TCE experiments did not record consistent shifts in TCE bulk enrichment factors of the unmodified nZVI and its sulfur-treated counterparts, nor did saturating the reaction mixture with $H_2$ bring about more rapid TCE removal, refuting a possible catalytic role played by the sulfide formation.

An alternative explanation points to enhanced electron transfer from the Fe(0) core to the solution phase by FeS surface deposits owing to its good electron conducting ability. The proposition is supported by the observation of increased anodic currents in recent electrochemical investigations, however, more rapid iron oxidation may not beget higher rates of TCE transformation since the latter reaction is not limited by electron transfer but the availability of atomic hydrogen. Furthermore, the rate enhancement effect caused by accelerated iron Garrison is expected to apply to other reducible contaminants, such as carbon tetrachloride (CT, $CCl_4$), whose reduction is governed by a direct electron transfer process. To this end, we evaluated reactions of CT with nZVI and sulfided nZVI. The results reveal nearly identical performance by nZVI and those receiving varying levels of sulfur dose. The effect of sulfidation is therefore specific for TCE dechlorination and cannot be ascribed to a general cause related to increased iron corrosion.

In catalysis, sulfur is a potent poison of hydrogen recombination reactions on metal surfaces. In the case of iron, corrosion in anaerobic water consists of two fundamental processes, namely the transfer of electrons to protons resulting in surface-adsorbed hydrogen atoms, and the recombination of hydrogen atoms to form molecular hydrogen that bubbles off the surface. The addition of sulfur on metal surface inhibits hydrogen recombination and as a result, slows down $H_2$ evolution. This forces more atomic hydrogen to remain on the surface or penetrate into the bulk substrate. Such effect has been investigated extensively and is known to cause hydrogen embrittlement and stress-induced cracking of steel.

Nonetheless, when iron is used as a chemical reductant, inhibition of hydrogen recombination would favor reactions involving atomic hydrogen, and we believe this effect is the primary mechanism responsible for the remarkable improvements in TCE degradation rates, since the reduction of chlorinated ethenes on iron are considered to be predominantly mediated by surface adsorbed atomic hydrogen. This action of sulfur is consistent with the highly specific effect of sulfidation on TCE reduction relative to that of chlorinated compounds undertaking different reduction mechanisms (e.g., carbon tetrachloride). It also corroborates with recent findings that $H_2$ production was suppressed in the presence of S-nZVI, in contrary to what would be expected if the increase in reactivity is contributed by enhanced iron corrosion. In this study, $H_2$ production by S-nZVI was also evaluated under conditions relevant to TCE dechlorination experiments. The results (e.g., see graph 62 of FIG. 6) clearly demonstrate that sulfur amendment exerts a strong impact on the rate of $H_2$ evolution.

Figure 6:
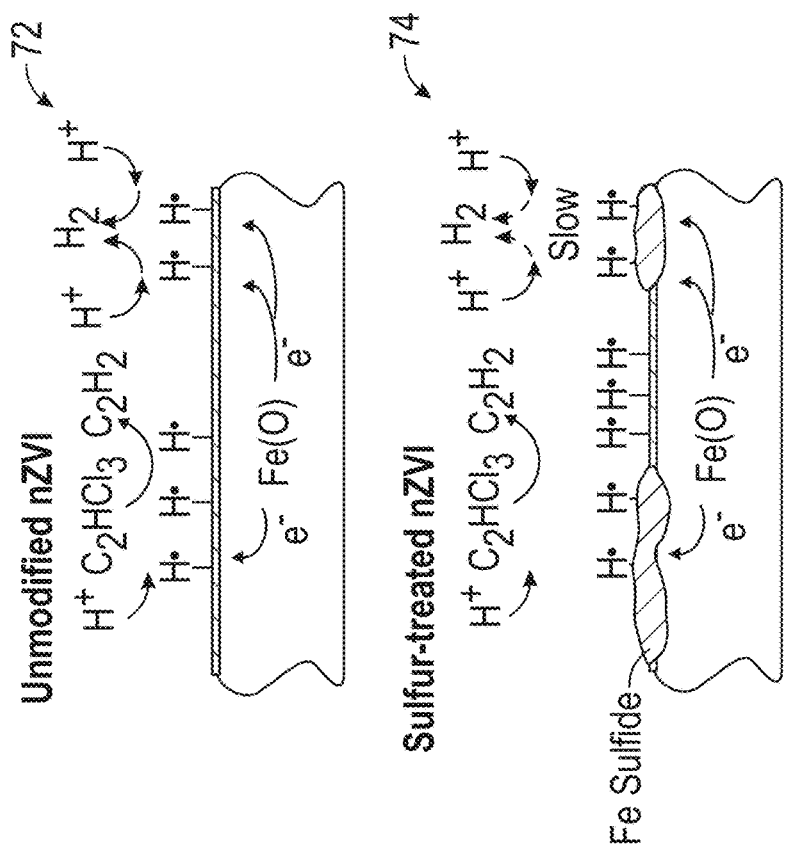
FIG. 6 illustrates graphs of data indicative of $H_2$ production by nZVI and S-nZVI of varying S/Fe mole ratio, and TCE degradation by S-nZVI and arsenic-modified nZVI (As-nZVI) at an As or S to Fe mole ratio of 0.05 in accordance with an example embodiment.

FIG. 6 illustrates a graph 62 that depicts data indicative of $H_2$ production by nZVI and S-nZVI of varying S/Fe mole ratio, and a graph 64 that depicts data indicative of degradation by S-nZVI and arsenic-modified nZVI (As-nZVI) at an As or S to Fe mole ratio of 0.05, in accordance with an example embodiment. Note that the particle dose was 5 g/L in all experimental embodiments.

Figure 7:
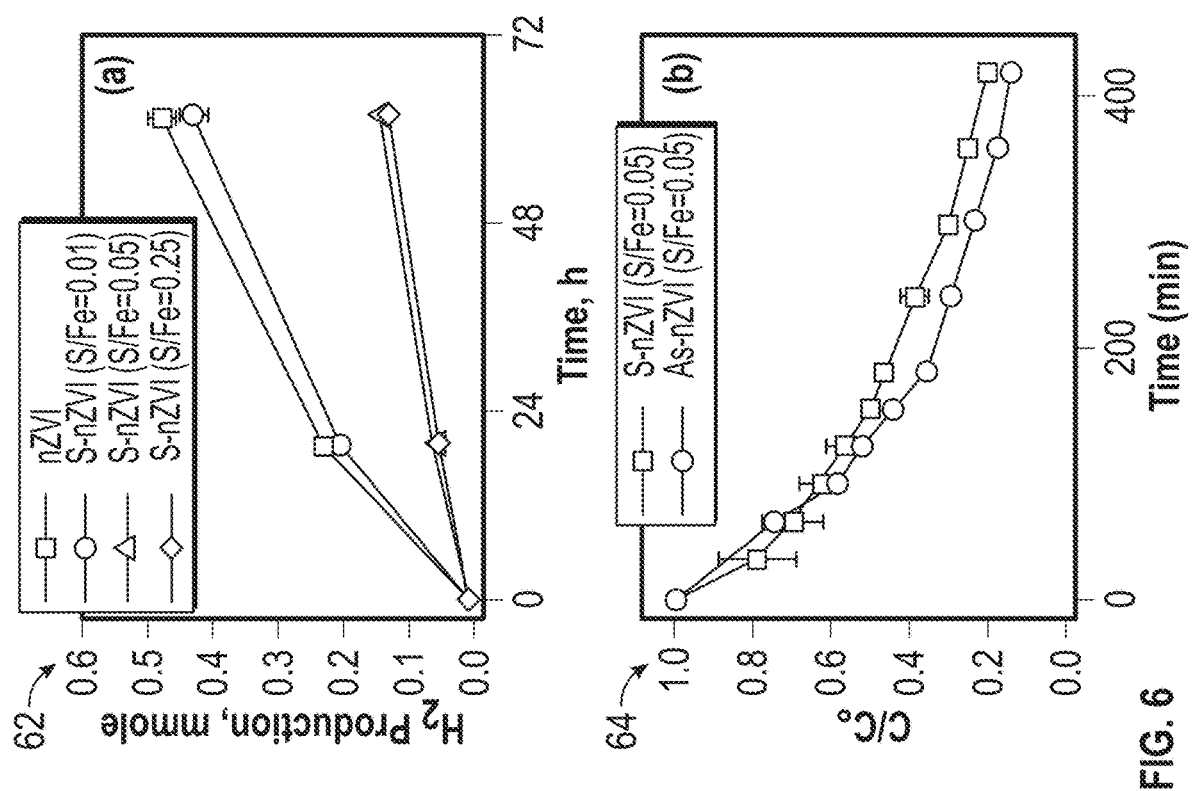
FIG. 7 illustrates schematic diagrams that respectively demonstrate the reactions on nZVI and S-nZVI in accordance with an example embodiment.

The trend of $H_2$ production shown in graph 62, that there is a notable decrease in $H_2$ generation rate when S/Fe ratio increases from 0.01 to 0.05 while further increase in sulfur loading does not give rise to significant reduction in $H_2$ generate rate, agrees with the effect of S dosage on TCE dechlorination kinetics (e.g., see graph 42 of FIG. 4). An additional argument in support of the poisoning effect of sulfur comes from TCE reduction by nZVI loaded with arsenic (As-nZVI), another potent deactivator of H recombination reactions. The As-nZVI was prepared using the same protocol as that of S-nZVI except that sodium arsenite was employed in place of sodium thiosulfate. The results indicate that arsenic-modified nZVI exhibited similar reactive behavior as the sulfur-modified particles towards TCE (e.g., see graph 64 in FIG. 6), releasing ethene as the dominant product. Thus, sulfur does not act as a direct facilitator of TCE dechlorination reaction, but rather modifies iron surface chemistry to favor the production of a key reactive species involved in TCE reduction. When sulfur is deposited on the iron surface, it induces dissolution of the native oxide and causes the surface to be more favorable for atomic hydrogen adsorption. Meantime, inhibition of hydrogen recombination promotes the build-up of atomic hydrogen on the iron surface and its reaction with TCE. The process is illustrated schematically in FIG. 7, which illustrates a schematic diagrams 72 and 74 that respectively demonstrate the reactions on nZVI and S-nZVI.

Finally, the dependence of the rate constant on S/Fe ratio in graph 42 of FIG. 4 suggests the existence of an optimal surface sulfur coverage. Exceeding this optimal loading, there is no further increase in reactivity, possibly due to the formation of polysulfides, discrete FeS precipitates, or oxidized sulfur species that do not contribute as effectively towards reactivity enhancement. The relatively low concentration of sulfur required to achieve this optimal loading implies effective sulfidation can be attained in dilute solutions of sulfur reagents.

ZVI is one of the most frequently applied and environmentally benign reductants for treating a broad variety of water contaminants. The ZVI chemistry has been studied extensively for chlorinated ethenes. Degradation of TCE by iron alone is relatively slow, and iron reactivity tends to be short-lived due to rapid passivation in air or water. Attempts to improve the performance of ZVI in the past has largely concentrated on a group of bimetallic ZVI particles. The catalyst metals amended on iron surface, such as Pd or Ni, are able to improve the rates of contaminant reduction by catalyzing the activation of $H_2$. The sulfidation method examined here represents a different approach to modify ZVI reactivity. Instead of serving as a catalyst, sulfur poisons a parallel reaction that competes with TCE for the electron source (i.e., water reduction and $H_2$ evolution), thereby increasing the accessibility of atomic hydrogen for TCE reduction.

Although under optimal conditions, the reactivity of these sulfur-modified ZVI may fall short of that of the highly reactive bimetallic materials (for example, $k_m$ of fresh Pd-nZVI prepared in our lab is approximately 1.4×10 L/g-min), iron sulfidation promises some crucial advantages from an environmental chemistry perspective. It circumvents the use of catalyst metals that are expensive or toxic to aquatic environment. Inhibition of hydrogen evolution effectively favors the reduction of the target contaminant (e.g., TCE) against the prevalent background reaction between iron and water. The last point will be of interest in large-scale field implementations as material efficiency and longevity in environmental matrices are important considerations in those circumstances. As the effects of sulfur manifest primarily through surface processes, sulfidation can be applied as a surface treatment procedure to pre-synthesized nZVI, and the method should in principle be extendable to other ZVI materials, including bulk iron granules or filing that are frequently used in remediation applications. Further investigations on sulfidation of other forms of ZVI material are underway.

Reduced sulfur compounds are ubiquitous in anoxic environment. Partially reduced sulfur anions such as thiosulfate, polysulfides, and sulfite may arise as intermediates during sulfide oxidation and their interconversion is strongly coupled with biogeochemical processes. Interestingly, these species are known to be strong inhibitor of catalytic systems including the bimetallic Pd—Fe. From this viewpoint, iron sulfidation not only offers a material that can sustain its reactivity in underground matrix where reduced sulfur ligands are abundant, but also suggests possibilities to optimize the outcome of iron-based remediation technologies via biogeochemical manipulations.

Tables 1 and 2 are shown below. Table 1 includes pseudo-first-order rate constants and product distribution of TCE dechlorination by nZVI and S-nZVI prepared under different conditions. In Table 1: [a] calculated from product formation over TCE consumption. [b] sum of products (as C2 equivalents) and TCE remain. Both [a] and [b] were determined at the point of ca. 90% TCE conversion or, for slow reactions, the last sampling point. [c] mass-normalized pseudo-first-order rate constants, uncertainties represent 95% confidence intervals.

TABLE 1

| Particle type | Sulfidation condition | Products | Yield[a] | Carbon recovery (%)[b] | $k_m$ ($10^{-3}$ L $g^{-1}$ $min^{-1}$)[c] |
|---|---|---|---|---|---|
| FeS | | Ethene | N.D. | 107 | 0.0024 ± 0.0007 |
| | | Ethane | N.D. | | |
| | | Acetylene | 126 | | |
| | | C3-C6 | N.D. | | |
| nZVI | | Ethene | 17 | 36 | 0.023 ± 0.008 |
| | | Ethane | 6.5 | | |
| | | Acetylene | N.D. | | |
| | | C3-C6 | 5.7 | | |
| S-nZVI (thiosulfate) | Post-synthesis sulfidation, S/Fe = 0.05 | Ethene | 44 | 68 | 0.80 ± 0.05 |
| | | Ethane | 10 | | |
| | | Acetylene | 4.5 | | |
| | | C3-C6 | 7.2 | | |
| S-nZVI (dithionite) | Post-synthesis sulfidation, S-Fe = 0.05 | Ethene | 33 | 68 | 0.78 ± 0.21 |
| | | Ethane | 8.2 | | |
| | | Acetylene | 10 | | |
| | | C3-C6 | 9.6 | | |
| S-nZVI (sulfide) | Post-synthesis sulfidation, S/Fe = 0.05 | Ethene | 39 | 67 | 1.04 ± 0.13 |
| | | Ethane | 9.4 | | |
| | | Acetylene | 7.2 | | |
| | | C3-C6 | 7.5 | | |
| S-nZVI (thiosulfate) | Pre-synthesis sulfidation, S/Fe = 0.05 | Ethene | 45 | 70 | 0.90 ± 0.08 |
| | | Ethane | 10 | | |
| | | Acetylene | 1.3 | | |
| | | C3-C6 | 8.1 | | |

Table 2 depicts mass-normalized rate constants of steps involved in TCE degradation by S-nZVI of varying S/Fe mole ratio. In Table 2: [a] obtained from TCE degradation experiments. [b] estimated from acetylene hydrogenation experiments.

TABLE 2

| S/Fe mole ratio | $k_1$ ($10^{-3}$ L $g^{-1}$ $min^{-1}$)[a] | $k_2$ ($10^{-3}$ L $g^{-1}$ $min^{-1}$)[b] | $k_3$ ($10^{-3}$ L $g^{-1}$ $min^{-1}$)[b] |
|---|---|---|---|
| 0.00125 | 0.18 | 1.03 | 0.22 |
| 0.05 | 1.16 | 0.68 | 0.15 |
| 0.25 | 1.11 | 0.60 | 0.11 |

Based on the foregoing, it can be appreciated that various example embodiments are disclosed herein for degrading chlorinated compounds in water. In an example embodiment, a facile aqueous-based surface treatment can be provided by a treatment mechanism with respect to iron to increase the reactivity of a zero-valent iron material for degrading chlorinated compounds in the water without the use of a noble metal catalyst. Such a facile aqueous-based surface treatment can be implemented as a surface sulfidation pre-treatment with respect to iron. The disclosed facile aqueous-based surface treatment increases reactivity utilizing sulfur compounds for use in the degradation of the chlorinated compounds in the water.

The disclosed embodiments offer a number of unique and original contributions. For example, the disclosed approach can use thiosulfate as a surface sulfidation reagent (the advantages of thiosulfate vs. other sulfur reagents used in the past is described herein). The present inventors have shown for the first time that only a small dose of sulfur reagent is required, whereas previous studies used high doses of sulfur reagents. In addition, the disclosed approach can demonstrate multiple protocols of surface sulfidation to be effective. The post-synthesis protocol is much easier to apply than the post-synthesis protocol used in the previous studies.

In addition, the present inventors have shown for the first time that the role of sulfur lies in it being the poison of a competing reaction on iron surface. The insight leads to several new observations. The most significant is that, the sulfur-treated iron should have much higher selectivity for chlorinated ethenes than non-treated iron. That is, sulfidation not only increases iron reactivity, but also its selectivity for the target contaminants. No existing technology has claimed the ability to achieve both.

In addition, the sulfidation treatment can be applied to any form of iron, nanoscale or bulk sized. It can be applied to commercially available iron filing, granules, or scrap iron, etc. The present inventors have proved that sulfidation may take place via many routes. Other than adding sulfur reagents, we can also use sulfate reducing bacteria (a genre of microorganisms ubiquitously present in the soil environment) to produce sulfur reagents in groundwater and soil.

Therefore, the sulfidation treatment may be performed on any new iron material prior to its installation in treatment facilities, as well as iron that is currently in use in the existing facilities (iron is the one of the most widely used materials for subsurface cleanup). The latter is most effectively done through biologically produced sulfur reagents.

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. A system for degrading chlorinated compounds in water, comprising:
   a treatment mechanism comprising a compound, said compound comprising iron and thiosulfate in a ratio of said thiosulfate to said iron from 0.001 to 0.01;
   wherein said thiosulfate provides a facile aqueous-based surface treatment with respect to said iron to increase a reactivity of a zero-valent iron material for degrading chlorinated compounds in water without the use of a noble metal catalyst.

2. The system of claim 1 wherein said facile aqueous-based surface treatment comprises a surface sulfidation pre-treatment with respect to said iron.

3. The system of claim 1 wherein said zero-valent iron material comprises a metal iron.

4. The system of claim 1 wherein said water comprises groundwater and said facile aqueous-based surface treatment comprises a treatment for remediation of said groundwater.

5. The system of claim 1 wherein said water comprises wastewater and said facile aqueous-based surface treatment comprises a treatment decontaminating said wastewater.

6. The system of claim 1 wherein said facile aqueous-based surface treatment comprises a treatment utilized in soil vapor intrusion mitigation.

7. The system of claim 1 wherein said facile aqueous-based surface treatment comprises a treatment utilized for an environmental cleanup operation.

8. A treatment system for degrading chlorinated compounds in water, comprising:
   a compound, said compound comprising:
   a zero-valent iron material; and
   a sulfidation reagent, said sulfidation reagent comprising thiosulfate, wherein said compound comprises a ratio of said sulfidation reagent to said zero-valent iron material from 0.001 to 0.01, wherein said thiosulfate provides a facile aqueous-based surface treatment with respect to said zero-valent iron material to increase a reactivity of said zero-valent iron material for degrading chlorinated compounds in water without the use of a noble metal catalyst.

9. The treatment system of claim 8 wherein said facile aqueous-based surface treatment comprises a surface sulfidation pre-treatment with respect to said zero-valent iron material.

10. The treatment system of claim 8 wherein said zero-valent iron material comprises iron nanoparticles.

11. The treatment system of claim 8 wherein said zero-valent iron material comprises a metal iron.

* * * * *